United States Patent [19]

Herrmann

[11] Patent Number: 5,494,694
[45] Date of Patent: Feb. 27, 1996

[54] METHOD OF MAKING A WHIPPED CREAM OF MILK

[76] Inventor: Martin Herrmann, Bussardhorst 32, D-31515 Wunstorf/Luthe, Germany

[21] Appl. No.: 266,654

[22] Filed: Jun. 28, 1994

[30] Foreign Application Priority Data

Jun. 30, 1993 [DE] Germany .......................... 43 21 675.7
Dec. 24, 1993 [DE] Germany .......................... 43 44 534.9

[51] Int. Cl.$^6$ .................................................. A23C 13/14
[52] U.S. Cl. .......................... 426/570; 426/564; 426/572; 426/586; 426/602
[58] Field of Search .................................. 426/564, 570, 426/572, 586, 602, 588

[56] References Cited

U.S. PATENT DOCUMENTS

| | | | |
|---|---|---|---|
| 3,968,267 | 7/1976 | Ogasa et al. | 426/570 |
| 4,338,347 | 6/1982 | Trop et al. | 426/572 |
| 4,451,492 | 5/1984 | Dell et al. | 426/564 |
| 4,637,937 | 1/1987 | Terada et al. | 426/570 |
| 5,077,076 | 12/1991 | Gonsalves et al. | 426/570 |

FOREIGN PATENT DOCUMENTS 3015825  3/1981  Germany .
3727680  3/1988  Germany .

*Primary Examiner*—Donald E. Czaja
*Assistant Examiner*—Lien Tran
*Attorney, Agent, or Firm*—Shlesinger Arkwright & Garvey

[57] ABSTRACT

A method for preparing a stable, whipped cream of milk filler product for cakes, pies or the like including the steps of formulating an aqueous mixture of dairy ingredients having from about 3.3 to about 12 percent by weight fat content and from 3 to about 11 percent by weight protein content, heating the aqueous mixture to denature any serum proteins, intermixing a honey component to the heated and denatured aqueous mixture, intermixing a supplemental component containing a sugar, glucose, starch and whipping agent, the supplemental component including from about 10 to about 52 percent by weight of the product, providing a viscosity modifying fat component containing an emulsifier and stabilizer, heating the fat component and intermixing with the supplemented mixture, sterilizing the supplemental mixture containing the modifying fat component, cooling the sterilized mixture to a pre-whipping temperature and whipping the cooled mixture to a desired consistency prior to filling.

20 Claims, No Drawings

METHOD OF MAKING A WHIPPED CREAM OF MILK

The invention concerns a whipped cream of milk and a method for its manufacture.

BACKGROUND OF THE INVENTION

The German patent 30 15 825 discloses sweets in the form of a soft substance whipped with an inert gas and based on an oil-water emulsion, containing milk ingredients, food fats, monoglycerides, sugar, lactose and water, with a pH range from 6.2 to 7.5. The substance is prepared foremost from sugared, partly skimmed condensed milk and besides non-lactosic sugar also contains lactose. The oil phase are predominantly food fats.

The German patent 37 27 880 discloses sweets in the form of a soft substance whipped with an inert gas and based on an oil-in-water emulsion and containing milk ingredients, fat components, sugar and water. Predominantly curd cheese or yogurt or a mixture thereof and fresh or condensed milk as well as a dry mixture of sugar and carob-seed flour are used in preparing said substance. The fat component is a vegetable fat and/or butter. This known method is costly because of the use of curd cheese, yogurt and condensed milk which must be prepared in previous processing stages. Adding condensed milk entails the problem of increasing the lactose content so much that the crystallization of the lactose makes the end product granular in structure. Carob tastes unpleasant and makes the final product tough.

The object of the present invention is to use milk to create a whipped milk cream with improved viscosity and taste and which can be manufactured more economically, furthermore with little danger of end-product granularity.

DETAILED DESCRIPTION OF THE PREFERRED EMBODIMENT

In the invention, the milk, concentrates of skim milk, concentrates from whole milk, concentrates of whey, water-dissolved powder of skim milk, water-dissolved powder of whole milk, and water-dissolved whey protein products, are intermixed and adjusted by means of vegetable animal fats such as cream, butter, butter oil, margarine, medium-fat products, and oils, to a fat content of 3.3 to 12%, per batch and removed at a temperature for instance of 4° C. from a storage tank into a batch tank. The mixture so set is heated by circulating through a tube or plate heat-exchanger to 60°–98° C., whereby powdered milk protein can be simultaneously added to adjust the protein content for instance between 3 and 11%. The effect of the heating is a denaturation of the serum proteins. Instead of milk protein other protein products such as plant protein products or egg protein may be used in liquid or dried form. The adjusted mixture is kept circulating for 4–45 minutes, at this temperature of 60°–98° C., preferably 10 minutes at 90° C.

Alternatively the mixture can be heated to 135°–145° C. using UHT (ultra high temperature) equipment maintaining the temperature 45 to 3 seconds and then cooling to 95°–90° C.

Upon termination of heat-treatment, honey or dry honey are added initially. Then dry components, namely sugar, starch, whipping means, vanilla sugar and, further flavoring agents are added. Illustratively the whipping agents can be products based on vegetable/animal fats and vegetable/animal proteins. Furthermore, coloring foodstuffs such as fruit Juices (cherry, raspberry juices etc.) and vegetable juices (red-beet Juice, spinach juice, carrot juice etc.) may be added.

Again the addition by means of a tri-blender may be carried out in circulation. The addition also can be implemented continuously with a subsequent, continuously operated mixer. Each batch container comprises an agitator with a special wall-wiper.

Thereupon a fat or a mixture of fats such as vegetable fat is admixed through heated pipes at about 40° to 80° C., the required quantities of stabilizers and emulsifiers having been previous metered for instance by a weighing container.

Next the finished mixture is heated for microbiological reasons to 70° to 145° C. because the admixing process will entail a temperature drop down to about 60° C. (±5° C.). The mixture of fats or the fat is treated in such manner that, especially as regards the main fat fractions, a specific melting point shall be achieved between 28° and 45° C., whereby it is possible to control the viscosity of the finished cream of milk. This range of melting points can be adjusted by using different fats, by fractionating a fat or a mixture of fats, or by hardening. Illustratively the addition of fats with a high melting point such as cocoa butter (oil) allows achieving or adjusting a higher viscosity.

For reasons of production engineering, the product can be cooled by means of a scraping heat-exchanger without whipping to a temperature of 4°–12° C. and be stored cold. Because of microbiological reasons, reheating to 70°–98° C. is required before further processing of the product.

The product will be cooled to a whipping temperature of 80° to 25° C. in order to minimize thermal stresses on this product. The finished product is moved by a variable pump to the whipping equipment wherein the whipping is carried out with air or an inert gas, preferably nitrogen. According to the desired structure, the overrun is 30–200%-volume. Before and after each whipping, the density and the volume are measured. Thereupon the whipped product is cooled to 35° down to −10° C., preferably in a scraping heat-exchanger. This procedure was carried out in tests using an experimental cooler type VWK 01/60-400 with a compressor made by Schröder & Co., Lübeck. The viscosity of the end product can be substantially controlled by the magnitude of the cool-down temperature as determined by the targeted fat crystallization. Further improvement in viscosity can be achieved by using two scraping heat-exchangers, the product being cooled to 35° to 20° C. in the first scraping heat-exchanger and to 20° to −10° C. in the second one.

For further viscosity adjustment, the product may be treated by a pinmixer, whereby the product is reheated by after-crystallization, for instance to about 12° C. if the prior cooling was down to 2° C. Again the product can be cooled to about 20° C. without undergoing pinmixer-treatment. Thereupon the product will be deposited. A pinmixer is an intensive kneader fitted with rotating pins. A back-pressure may be built up by a throttling valve following the pinmixer. The deposition of the finished cream on a suitable dough is selectively carried out with cooled rollers or with a specially designed nozzle system. Thereupon the finished product is packaged under low-germ conditions, cooled and stored.

Moreover a given quantity of rework material (0 to 50%) may be continuously removed behind the pinmixer from the finished mixture in order to match the quantity of product to the order output. The rework quantity is returned through heated pipes into a remelt tank where it is heated by hot water to about 35° to 70° C. and then is admixed to the finished batch mixture.

The description of the method of the invention makes it plain that besides the required additives only milk adjusted to a specified fat content will be used. The end product therefore contains only a very low lactose portion and thereby the danger of granularity will be minimized. Depending on recipe, the end product for instances evinces the following composition:

TABLE

| FEATURES | Mixture |
|---|---|
| pH | 6.0–6.9 |
| Viscosity | 200–15,000 mpa · s* |
| Aw value*** | 0.70–0.85 |
| Density | 1.0–1.10** |
| Total fat | 32–36% weight |
| Carbohydrates | 30–40% weight |
| Total protein | 2–7% weight |
| Water content | 22–30% weight |

NOTES:
A dropping-ball viscosimeter according to Höppler was used to determine viscosity.
*at 50° C.
**in non-whipped state
***water activity value The stated composition can change if corresponding aromatization is taking place. Minor changes occur when adding aroma or spices. Large changes arise when adding fruit or vegetable concentrates or fruit preparations or cacao powder.

The protein content may change substantially when adding processed cheese mixtures to make a milk cream with a cheesy taste.

A procedural sequence is illustratively described below based on the illustrative recipe 1:

heating fresh milk adjusted by means of milk cream and protein powder to a fat content of about 8.3%-weight and a protein content of about 9.2%-weight to 90° C. to thermally denature the serum proteins and for microbiological reasons, keeping the mixture hot at 90° C. for 10 minutes, admixing about 4%-weight honey by agitation to the milk, admixing by agitation about 41.4%-weight of dry components, namely sugar, wheat starch, whipping agents, vanilla sugar, and 0.23%-weight aroma, melting vegetable fats and mixing with lecithin emulsifier and stabilizer, admixing the fat mixture with the mixture obtained following dry-component mixing, heating the total mixture to 75° C., cooling the mixture to a whipping temperature of about 45° C., whipping the mixture at about 100% whipping using industrial whipping equipment, cooling the whipped mixture to 2° C., post-treatment of the whipped mixture with a pin-mixer, crystallizing the mixture, and depositing the finished, creamy mixture on a dough.

Four recipes are illustratively listed below, which contain different flavoring agents:

| RECIPE 1, WHIPPED MILK CREAM | |
|---|---|
| fresh milk, 3.5% fat | % weight 23.09 |
| milk cream | 3.97 |
| fat | 23.82 |
| refined crystal sugar | 17.35 |
| glucose | 6.95 |
| stabilizer | 0.99 |
| lecithin | 0.50 |
| whipping agent | 15.39 |
| honey | 3.97 |
| milk protein | 1.99 |
| wheat starch | 1.74 |
| vanilla sugar | 0.01 |
| aroma | 0.23 |

| RECIPE 2, WHIPPED MILK CREAM WITH HIGHER MILK PROPORTION | |
|---|---|
| fresh milk, 3.5% fat | % weight 36.18 |
| milk cream | 3.84 |
| fat | 23.04 |
| refined crystal sugar | 16.78 |
| stabilizer | 0.96 |
| lecithin | 0.48 |
| whipping agent | 12.96 |
| honey | 3.84 |
| wheat starch | 1.68 |
| vanilla sugar | 0.01 |
| aroma | 0.22 |

| RECIPE 3 WHIPPED "STRAWBERRY" MILK CREAM | |
|---|---|
| fresh milk, 3.5% fat | % weight 19.69 |
| milk cream | 3.71 |
| fat | 23.87 |
| refined crystal sugar | 17.05 |
| glucose | 6.99 |
| stabilizer | 0.95 |
| lecithin | 0.49 |
| whipping agent | 15.52 |
| honey | 3.85 |
| powdered milk protein | 2.13 |
| wheat starch | 1.71 |
| vanilla sugar | 0.01 |
| aroma | 0.21 |
| solution of red-beet juice | 3.82 |

| Recipe 4 WHIPPED "SCHOKO" MILK CREAM | |
|---|---|
| fresh milk, 3.5% Fat | % weight 25.31 |
| fat | 23.62 |
| refined crystal sugar | 15.19 |
| glucose | 7.17 |
| stabilizer | 1.01 |
| lecithin | 0.55 |
| whipping agent | 16.45 |
| honey | 3.35 |
| powdered milk protein | 1.27 |
| wheat starch | 1.86 |
| vanillin sugar | 0.01 |
| cacao | 4.22 |

I claim:

1. A method for preparing a stable, whipped cream of milk filler product for cakes and pies comprising the steps of:

a) formulating an aqueous mixture of dairy ingredients including a fat fraction and a protein fraction and having at least one ingredient selected from the group consisting of whole milk, reconstituted milk and modified milk, the aqueous mixture having formulated therein a fat content from about 3.3 to about 12 percent by weight and a protein content from about 3 to about 11 percent by weight;

b) heating the aqueous mixture to sufficiently denature any serum proteins therein;

c) intermixing a honey component to the heated and denatured aqueous mixture, the honey component comprising from about 2 to about 6 percent by weight of a total filler product ingredients;

d) intermixing with the aqueous mixture containing the honey component, a supplemental mixture containing sugar, glucose, starch and whipping agents, the supplemental mixture comprising from about 10 to about 52 percent by weight of the total filler product ingredients;

e) providing a viscosity modifying fat component having a melting point within melting point range of the aqueous mixture fat fraction, the fat component additionally contains an emulsifier and stabilizer;

f) heating the viscosity modifying fat component and intermixing the heated fat component with the supplemented aqueous mixture to provide a viscosity modified mixture;

g) heating the viscosity modified mixture to cause at least one of sterilization and pasteurization;

h) cooling the sterilized and pasteurized mixture to a pre-whipping temperature of about 80° C. to about 25° C.;

i) whipping and aerating the sterilized and pasteurized mixture; and j) cooling the whipped and aerated mixture to a desired consistency prior to filling.

2. The method of claim 1 and further including the steps of:

a) crystallizing the cooled mixture to form a filler product; and b) depositing the filler product onto a foodstuff.

3. The method of claim 1 and wherein:

a) the aqueous mixture includes at least one of whole milk, skim milk, whole milk concentrates, whey concentrates, powdered skim milk, powdered whole milk and water dissolvable whey protein product.

4. The method of claim 1 and wherein:

a) formulating the aqueous mixture by adding at least one of vegetable fat and animal fat.

5. The method of claim 1 and wherein:

a) formulating the aqueous mixture by adding at least one of milk protein, plant protein and egg protein.

6. The method of claim 1 and wherein:

a) heating the aqueous mixture to denature the serum proteins by raising the temperature of the aqueous mixture from about 60° C. to about 98° C. for about four to forty five minutes.

7. The method of claim 1 and further including the steps of:

a) heating the aqueous mixture to denature the serum proteins by raising the temperature of the aqueous mixture from about 135° C. to about 145° C. for about three to about forty-five seconds; and b) cooling the denatured aqueous mixture to a temperature of about 90° C. to about 95° C.

8. The method of claim 1 and wherein:

a) heating the modified fat component to a temperature of about 40° C. to about 70° C. prior to intermixing.

9. The method of claim 1 and wherein:

a) intermixing the heated modified fat component with the supplemented aqueous mixture while heating to a temperature of about 40° C. to about 80° C.

10. The method of claim 1 and wherein:

a) heating the viscosity modified mixture to a temperature of about 70° C. to about 145° C. to cause sterilization.

11. The method of claim 1 and further including the step of:

a) adjusting the modifying fat component to have a melting point from about 28° C. to about 45° C.

12. The method of claim 11 and wherein:

a) the adjustment to the melting point of the modifying fat component is made by selectively fractionating a fat within the fat component.

13. The method of claim 11 and wherein:

a) the adjustment to the melting point of the modifying fat component is made by selectively adding a fat to the fat component.

14. The method of claim 11 and wherein:

a) the adjustment to the melting point of the modifying fat component is made by hardening of the fat component.

15. The method of claim 13 and wherein:

a) the added fat is cocoa butter oil.

16. The method of claim 1 and further including the step of:

a) circulating the aqueous mixture during the formulating, heating and intermixing steps.

17. The method of claim 1 and further including the steps of:

a) cooling the sterilized mixture to a temperature of about 4° C. to about 12° C.;

b) storing the cooled mixture; and c) heating the stored mixture to a temperature of about 70° C. to about 98° C. and then cooling to pre-whipping temperatures.

18. The method of claim 1 and wherein:

a) whipping the sterilized and pasteurized mixture with a gas to an overrun volume of 30 to about 200 percent.

19. The method of claim 1 and further including the steps of:

a) removing a quantity of the filler product prior to filling;

b) heating the removed quantity to a temperature of about 35° C. to about 70° C.; and c) adding the heated removed quantity to the heated viscosity modified mixture.

20. The method of claim 1 and further including the step of:

a) adding at least one additional material to the supplemented aqueous mixture, the additional material is selected from the group consisting of fruit juice and vegetable juice.

* * * * *